Feb. 4, 1941.　　　A. E. DOUGLASS　　　2,230,832
METHOD AND APPARATUS FOR DRYING AND HEAT TREATMENT OF WET MATERIAL
Filed April 3, 1940　　　3 Sheets-Sheet 1

INVENTOR
Alfred E Douglass
BY
Pennie Davis Marvin Edmonds
ATTORNEYS

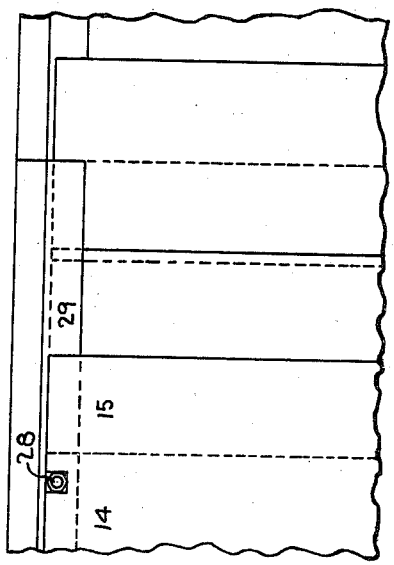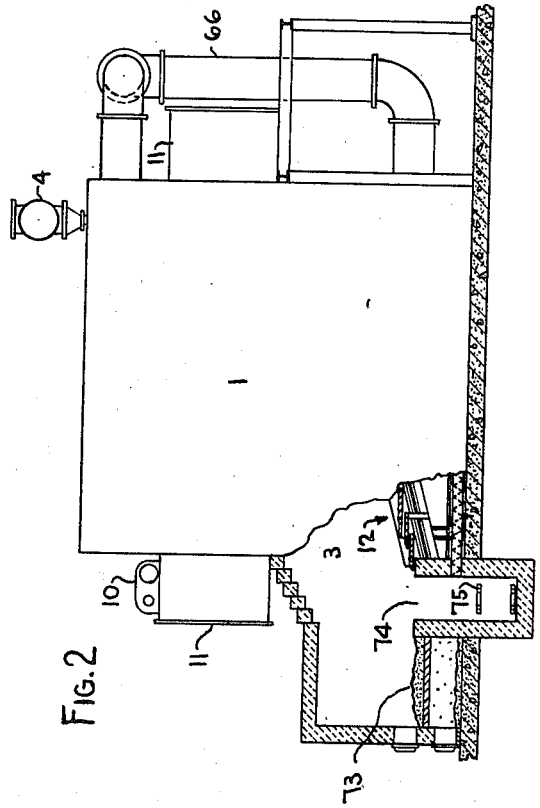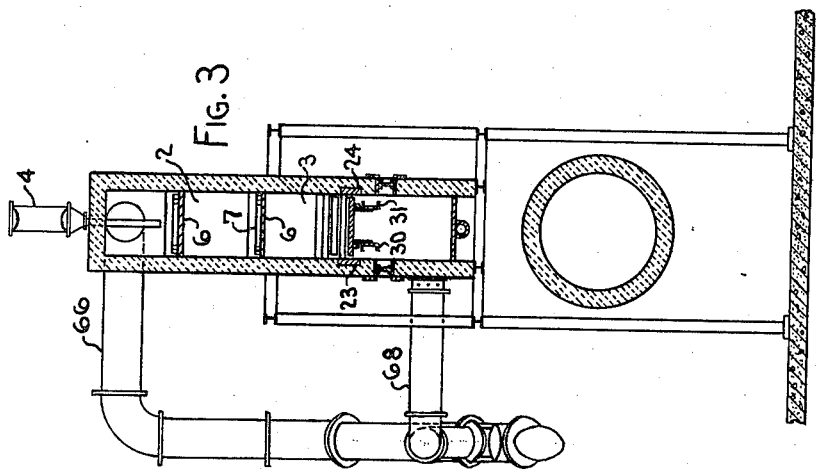

Feb. 4, 1941.   A. E. DOUGLASS   2,230,832
METHOD AND APPARATUS FOR DRYING AND HEAT TREATMENT OF WET MATERIAL
Filed April 3, 1940   3 Sheets-Sheet 3

INVENTOR
*Alfred E Douglass*
BY
ATTORNEYS

Patented Feb. 4, 1941

2,230,832

UNITED STATES PATENT OFFICE 2,230,832

METHOD AND APPARATUS FOR DRYING AND HEAT TREATMENT OF WET MATERIAL

Alfred E. Douglass, Catasauqua, Pa.

Application April 3, 1940, Serial No. 327,608

10 Claims. (Cl. 34—24)

This invention relates to the drying and heat treatment of materials, which carry or are suspended in liquid, for the purpose of driving off the liquid either wholly or in part, and, in some instances, raising the dried materials to elevated temperatures so that subsequent operations thereon may be facilitated. More particularly the invention is concerned with a novel method of treating wet materials for the purposes mentioned, which is superior to available prior methods in that it may be practised with greater heat economy, and, therefore, more rapidly, and the invention also includes a new apparatus by which that method may be advantageously and conveniently practised.

The method of the invention is of general utility and is adapted for use when the solid content of the wet materials is either to be recovered as the desired final product or is to be placed in a form suitable for a subsequent treatment or use, such as burning to cause the desired reactions to take place, or consumed in combustion to extract available heat units. The new method is, accordingly, suitable for use, for example, in the treatment of slurries and sludges, such as paper mill wastes, the evaporation of liquids from solutions, the drying of moist soda ash, etc. In all instances, the employment of the process of the apparatus of the invention makes possible efficient extraction of heat units from the hot gases used in the operation and, when waste gases are employed, affords important savings in fuel.

Heretofore various methods and apparatus have been employed in the treatment of waste materials for the purposes set forth, but those methods and devices have been of unsatisfactory performance because of their low efficiency. The problem presented is that of obtaining good contact and heat transfer between the gases and the materials and the problem is a difficult one because of the characteristics of the materials undergoing treatment. Thus, if a material is of relatively fine particle size, it is difficult to pass the gases through a bed thereof and the dust losses are excessive, while if the gases are caused to travel over the top of the bed only, a surface drying effect is obtained because of the poor heat conductivity of the material. If the material is relatively coarse and substantially without fines, the gases are not likely to flow uniformly through a bed thereof with the result that certain portions of the materials are heated and dried and the remainder not. Also, the support for such a bed of coarse materials must be made of expensive heat-resisting metal, since otherwise it is liable to be burned out at the points of concentrated gas flow.

The prior methods and apparatus have been found to be impractical in the treatment of slurries and sludges, since such materials must first be partially dried to render them non-fluent and the characteristics of the partially dried product make it difficult to handle efficiently.

The present invention is, accordingly, directed to the provision of a method and apparatus by which wet material of various types may be deprived of its moisture content and placed in condition for use or for further treatment at low fuel cost and with the production of a uniform product. In the practise of the new method, the material to be treated is deposited upon a heated surface and moved along the latter by suitable means, while a stream of hot gases travels along and in contact with the top of the layer. In such movement, the material is dried to a greater or less extent, depending upon the conditions of operation, and at the end of its travel along the surface, the material may be transferred to another similar surface for further treatment or it may be delivered to an inclined support to form a bed thereon.

As deposited upon the support, the material is ordinarily in the form of cakes or lumps of irregular shape and size, and the bed is intermittently and regularly advanced down the support while being constantly agitated. A flow of hot gases is maintained over the surface of the bed while the latter is moving down the support and the constant agitation of the bed causes all of the bodies therein to be brought into contact with the gases. The agitation further tends to grade the material, with the larger particles or lumps on top and the smaller ones beneath, and this is advantageous since the larger lumps containing the most moisture are in direct contact with the gases. The intermittent advance of the bed and the constant agitation thereof also breaks up the larger particles so that the material in the bed has a constantly increasing surface area exposed to the action of the gases.

In some instances, it may be desirable not only to pass the heated gases over the surface of the bed but also to cause a portion of the gases to pass through the bed. This increases the contact between the particles and the heating medium and expedites the treatment. If desired, the gases may be caused to pass through certain portions of the bed and not through others.

When the method and apparatus of the invention are employed for the preliminary drying and heating of a material which is subsequently to be burned, as, for example, in a rotary kiln, the hot waste gases of combustion may be used in the preheating and drying. In the use of a rotary kiln for burning wet waste or slurry, a substantial portion of the kiln is employed for the elimination of the moisture from and the preheating of the material being fed. The ultimate burning treatment of the material must then be carried on in the remainder of the kiln and a relatively long kiln must be employed in some instances in order that the operation may be carried on efficiently. By the use of the present method and apparatus for the preliminary drying and preheating of material to be fed to the kiln, it is possible to devote substantially the entire length of the kiln to various phases of the burning treatment and a shorter kiln may, therefore, be used than would otherwise be permissible. In the treatment of wet materials, such as sludges of materials combustible in the dry state, it is possible to burn the materials while on the inclined support, combustion having been initiated by a pilot burner or similar expedient. If such a sludge is of high dilution, it may be desirable to add fuel, such as crushed coal, thereto in order to reduce the treating period. By such addition of fuel, the fluidity of the sludge is decreased and a smaller apparatus may be used in carrying out the process.

For a better understanding of the invention, reference may be made to the accompanying drawings illustrating one form of apparatus suitable for the practise of the new method. In these drawings:

Fig. 2 is a view in elevation of another form of the apparatus with parts shown in section;

Figure 1:
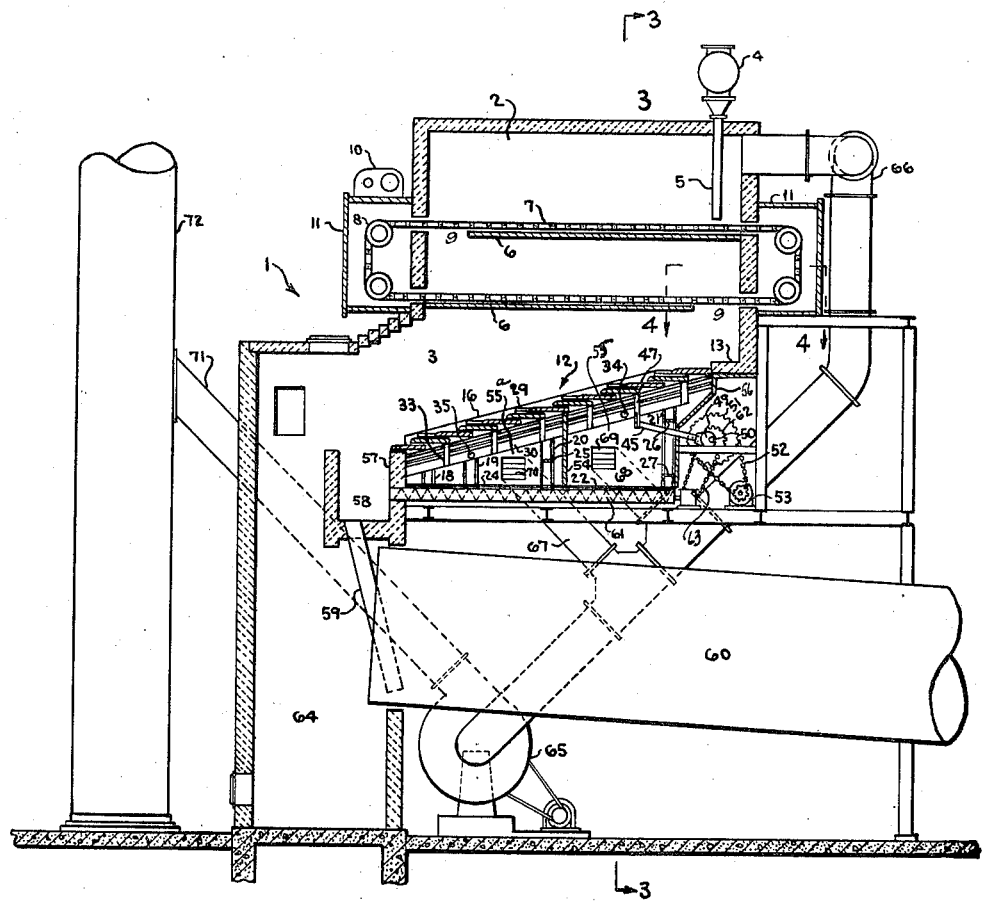
Fig. 1 is a vertical section through the apparatus.
Figure 4:
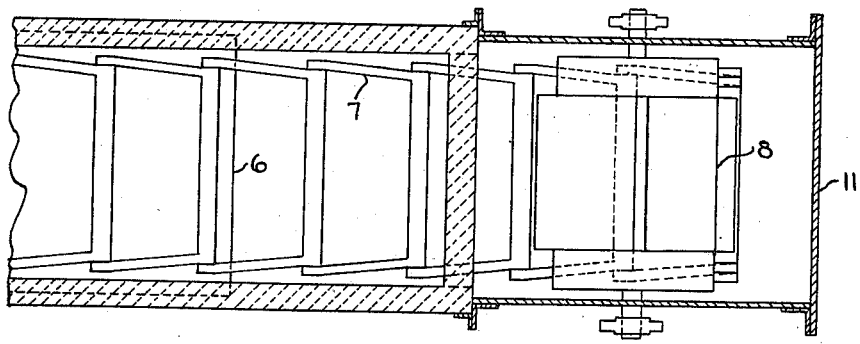
Figure 6:
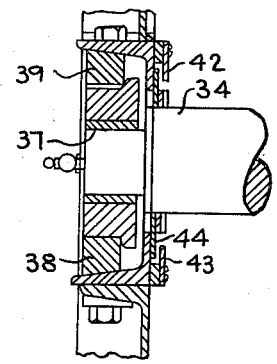
Figure 5:
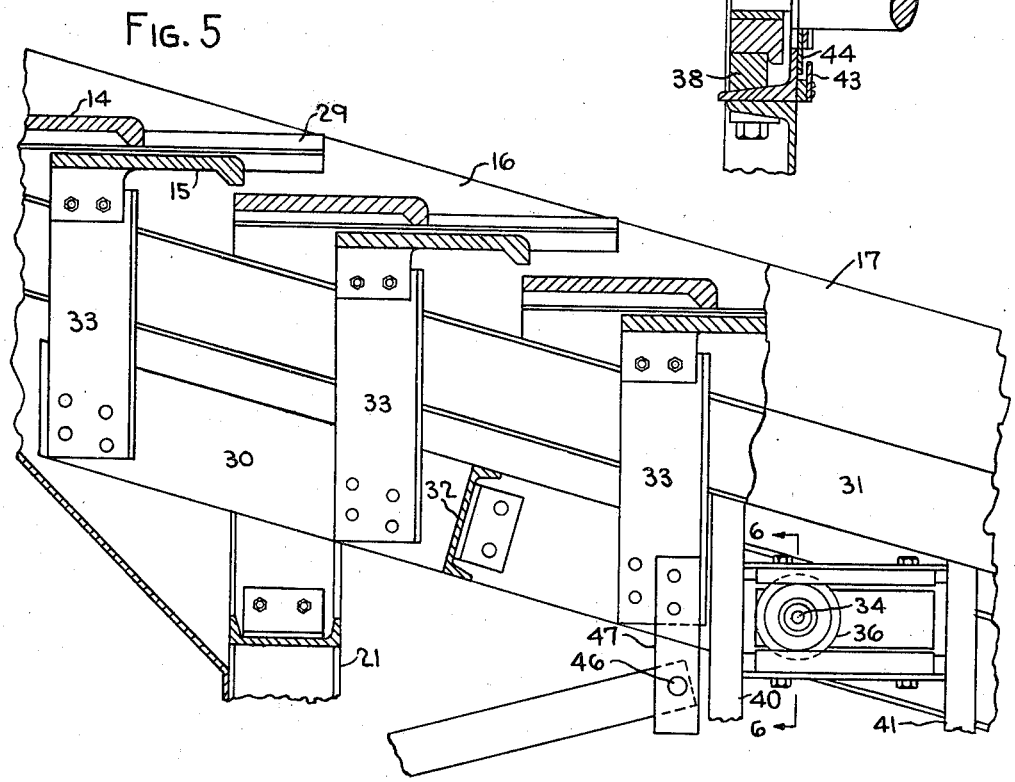

Figs. 3 and 4 are sectional views on the line 3—3 and 4—4, respectively, of Fig. 1;

Fig. 5 is an enlarged sectional view through a portion of the inclined support;

Fig. 6 is a sectional view on the line 6—6 of Fig. 5; and

Fig. 7 is a fragmentary plan view of a part of the apparatus shown in Fig. 5.

The apparatus illustrated in the drawings includes a chamber 1 containing a preliminary drying compartment 2 and a final drying and heating compartment 3. The wet material to be treated is fed to the compartment 2 from a source of supply (not shown) by a measuring feeder 4 of conventional construction, the material being delivered through a discharge pipe 5 to an upper horizontal plate or drying pan 6. This plate extends across the compartment 2 from side to side thereof and abuts one end wall but stops short of the other. Traveling over the surface of the plate is one stretch of a drag chain 7 which passes through openings in the end walls of compartment 2 and is trained over guide pulleys 8. The chain advances the material along the plate 6 to the free end thereof where the material drops through the opening 9 to a lower plate 6. The lower plate is similar to the upper one but abuts the opposite end wall of compartment 2, so that the lower opening 9 at the end thereof is out of alignment with the upper opening. The chain is driven by any suitable variable speed means 10, such as a motor and a "Reeves drive" and the lower stretch of the chain passes along the lower plate 6 toward the discharge opening. The material is, accordingly, advanced along the upper and lower plates in opposite directions and finally leaves the lower plate through lower opening 9. The guide pulleys 8 for the chain are enclosed within housings 11 outside the end walls of compartment 2 and the housings prevent material clinging to the chain from being discharged upon the floor or nearby apparatus.

In the construction illustrated, there are two drying plates 6, but additional plates may be employed, if the nature of the material to be treated so requires. The plates are preferably made of heat conducting material so that heat may be transmitted therethrough to the materials resting thereon.

In its travel along the plates, the material undergoing treatment is subjected to the action of hot gases and takes up heat from the plates, so that the material discharged through the lower opening 9 is wholly or partly dried. This material drops down into the heating compartment 3 where it is further dried and heated while supported on an inclined grate 12. Ordinarily a sufficient amount of moisture has been removed from the material in the drying compartment, so that as it enters the compartment 3, it is non-fluent and in the form of cakes or lumps of varying size. These bodies accumulate upon the shelf 13 at the upper end of the grate until the mass so collected acquires a surface at the natural angle of repose of the material, and thereafter, additional material discharged through the opening 9 upon the mass slides down to the grate.

The grate is made up of alternately arranged fixed and movable grate members 14 and 15 which extend transversely of the grate and are supported, respectively, on stationary and movable frames. The stationary frame comprises inclined structural members 16 and 17 secured to upright supports 18, 19, 20, 21 attached to lower horizontal frame members 22 resting upon ledges 23, 24 on the side walls of the compartment. The frame is completed by transverse braces 25 connecting upright supports 20 and brace 26 connecting uprights 27. The stationary grate members 14 are secured by bolts 28 to brackets 29 welded or otherwise fastened to the frame members 16 and 17 and each bracket extends outwardly beyond the front edge of its associated grate member and over the top of the adjacent movable grate member 15 to prevent material from passing between the side edge of the movable member and the frame member on which the bracket is mounted.

The movable frame comprises inclined side members 30, 31 connected by transverse braces 32 and carrying upright supports 33 to the upper ends of which are attached flanges formed as integral parts of the movable grate members 15. The side members 30 and 31 are connected by axles 34, 35 on which flanged wheels 36 freely turn on bushings 37 and the wheels run on lower rails 38 and are guided by upper rails 39, the rails being secured to structural members attached to uprights 40, 41 on the stationary frame. Upper and lower plates 42, 43 are attached to the structural members so as to overlie a plate 44 carried by each axle at one side of each wheel 36, the several plates cooperating to prevent air from entering the chamber below the grate.

The movable frame is reciprocated by rods 45 pivoted on crossbars 46 mounted in brackets 47 attached to suitable parts of the movable frame structure, and the rods pass through slots in one wall of the chamber 3 and are connected to straps 49 encircling eccentric discs 50 on a rotary shaft.

The shaft is provided with a sprocket wheel 51 driven through a chain 52 by a variable speed motor 53 and on operation of the motor, the movable grate structure is moved back and forth with the grate members 15 reciprocating in horizontal planes between fixed grate members 14. In Fig. 5, the movable grate members 15 are shown in their rearmost position and the maximum permissible advance therefrom is about one-half the width of the members. At this point, the rear edge of each movable grate member lies beneath the forward edge of the fixed grate member above it, so that the material supported on the grate is prevented from passing between adjacent grate members. The rate of reciprocation of the movable frame as determined by the speed of the motor 53 controls the rate of travel of the bed of material along the grate and the thickness of the bed.

The fixed and movable grate members are substantially the same in form and construction and may be grey iron castings. Preferably the forward edges of the fixed grate members and the side edges of the moving grate members are chilled so as to be more resistant to wear caused by abrasive material undergoing treatment. Successive grate members down the grate are spaced apart to form horizontal air passageways which are usually about ¼" in height.

That portion of the compartment 3 below the grate is divided by a division wall 54 into exhaust compartments 55 and 55a extending between the side walls of compartment 3, the compartment 55 being closed by a wall 56 and compartment 55a, by a refractory wall 57 upon which the lowermost grate member rests. Wall 57 forms part of a trough 58 into which the treated material is discharged, and in the construction illustrated in Fig. 1, the material in the trough passes therefrom through a chute 59 into the upper end of a rotary kiln 60. Extending lengthwise of the grate 12 and close to the floor of compartment 3 is a screw conveyor 61 driven by motor 53 through a sprocket wheel 62 and chain 63, and the conveyor delivers into the discharge trough 58 any material which passes through the grate.

The upper end of the kiln extends into a passage 64 which leads to that part of the compartment 3 above the grate, and the hot exhaust gases from the kiln flow up through the passage and over the grate in contact with the material thereon and also with the under surface of the lower plate 6. The gases then pass up through the lower opening 9, the space between the plates, and up through the upper opening 9 into the upper part of the compartment 2, whence they are drawn off by a fan 65 through the duct 66. Branch ducts 67 and 68 lead to duct 66 from shuttered openings 69, 70 in the walls of exhaust compartments 55, 55a, and the shutter mechanisms make it possible to draw gases in controlled amounts through the portions of the grate above the exhaust compartments. The exhaust side of the fan 65 is connected by duct 71 to a stack 72 through which the gases escape to the atmosphere.

In the construction shown in Fig. 2, the compartment 3 has an extension forming a furnace 73 by which the hot gases used in the treatment of materials are supplied, and the material discharged from the grate 12 enters a trough 74 whence it is removed by a conveyor 75. The hot gases may be produced by the combustion of various types of fuel, such as coal, oil, and gas, and when the apparatus is employed to treat material which is combustible in the dry state, the dried material may be used in the furnace to supply all or a part of the hot gases required.

In the practise of the method by the apparatus described, the material advanced successively over the plates 6 and thus through the tortuous passage defined thereby is dried partly by the heat of the gases flowing over the surface of the layers of material and partly by heat transmitted through the plates. The condition of the material discharged through the lower opening 9 depends on the moisture content of the material fed to the apparatus, the rate at which the material is moved along the horizontal supporting surfaces, and the temperature of the gases employed in the treatment. As discharged upon the grate 12, the material, ordinarily in the form of irregular lumps, forms a bed which is usually maintained at from 3" to 6" in thickness, and the material in the bed is advanced down the grate by the action of the movable grate members which are reciprocated by eccentrics ordinarily driven at from 4 to 8 R. P. M. The continuous agitation and rolling to which the particles and lumps of the material are subjected as they descend from one level to the next on the grate causes all of the bodies in the bed to be exposed to the action of the gases and also tends to grade the bed with the larger particles at the top. The gases travel over the bed countercurrent to the descending material and when the gases are passed through the bed and into the exhaust compartments, the flow of the gases between adjacent grate members is in a direction generally opposite to the direction of advance of the material. As the moving grate members are advanced and retracted in horizontal plane, changes occur in the gas flow through the bed and this insures thorough contact of the gases with the material.

While the drying pans or plates in the preliminary drying compartment are shown as comprising flat horizontal members, with the material advanced thereover by reaches of an endless chain, other constructions may be resorted to, such as, trough-like drying pans, semi-circular in cross-section with screw conveyors of the pug mill type having disconnected paddles forming the flights, these conveyor screws extending the length of the passageways. This type of construction has the advantage of exposing a greater area of the material to the heated gases as the paddles rotate, the material normally being confined to the lower portion of the trough.

Reference is hereby made to my copending applications Serial Nos. 327,607 and 327,609, filed concurrently herewith.

I claim:

1. Apparatus for the treatment of wet materials which comprises the combination of a preliminary drying chamber having an entrance opening for the material to be treated near its top, stationary vertically spaced generally horizontal evaporating pans within the chamber, said evaporating pans extending from one end wall and terminating short of the opposite end wall to divide the chamber into a plurality of sealed passageways, alternate evaporating pans terminating short of opposite end walls to form openings for the discharge of material to the uppermost evaporating pan at its closed end, conveying means positively advancing the material over the evaporating pans to the discharge openings, a heating chamber below the drying chamber to receive the material from the discharge opening of the lowermost passageway of the drying chamber, a support for the material to be treated comprising a series of overlapping vertically spaced stationary and movable members, with the stationary members alternating with the movable members, means to reciprocate the movable members to advance intermittently and constantly to agitate the material, means directing heated gases above the material, said support being downwardly inclined at an angle less than the angle of repose of the material so that during advancement of the material along said support it will be formed into and maintained in a bed of substantially uniform thickness and the constant agitation thereof by said reciprocating means will cause the material of the bed to be graded according to particle size with the larger particles at the surface of the bed where they will be the first particles contacted by the hot gases.

2. Apparatus for the treatment of liquids containing a large percentage of solid matter to remove the moisture therefrom and raise the temperature of the solid particles comprising the combination of a drying chamber having an entrance opening near its top and a discharge outlet near its bottom, vertically spaced generally horizontal supports within the chamber, said supports extending from one end wall and terminating short of the opposite end wall to divide the chamber into a plurality of passageways, alternate supports terminating short of opposite end walls to form openings for the discharge of the material to the next lower member, means for advancing the material along the supports in succession, a heating chamber having an entrance opening near one end to receive the material from the drying chamber and a discharge port near the other end, a support within the heating chamber on which the material is deposited, the support comprising fixed members alternating with movable members, means for reciprocating the movable members to agitate and advance the bed, means for supplying heated gases to the heating chamber above the bed, and means for causing the gases to flow over the material in the heating chamber and through a tortuous passage in the drying chamber defined in part by the supports therein, said support being downwardly inclined at an angle less than the angle of repose of the material so that during advancement of the material along said support it will be substantially continuously agitated to form a bed of substantially uniform perviousness.

3. Apparatus for the treatment of moisture containing materials to remove the moisture therefrom and raise the temperature of the solid particles comprising the combination of a drying chamber having an entrance opening near its top and a discharge outlet near its bottom, vertically spaced generally horizontal heat conducting members within the chamber, said members extending from one end wall and terminating short of the opposite end wall to divide the chamber into a plurality of sealed passageways, alternate members terminating short of opposite end walls to form openings for the discharge of the material to the next lower member, means for advancing the material along the successive supports toward the discharge outlet, a heating chamber below the drying chamber having an entrance opening near the one end to receive the material from the drying chamber and a discharge port near the other end, a support within the heating chamber on which the material is deposited, the support comprising a series of spaced overlapping fixed members alternating with movable members, means for reciprocating the movable members to agitate and advance the bed, means for supplying heated gases to the heating chamber above the bed, and means for causing the gases to flow over the bed in the heating chamber and through the tortuous passage in the drying chamber in contact both with the surface of the material and with the heat conducting members therein, said support being downwardly inclined at an angle less than the angle of repose of the material so that during advancement of the material along said support it will be substantially continuously agitated to form a bed of substantially uniform perviousness.

4. Apparatus for the drying and heating of materials which comprises a drying compartment having an outlet, a plurality of vertically spaced members in the compartment to form passageways for heated gases, said members terminating short of opposite end walls of the chamber to form openings for discharge of the material to the next lower member, means for depositing material to be treated upon the uppermost member, means for advancing the material along the members successively in opposite directions to the outlet, a heating compartment to which the outlet leads, a support within the heating compartment comprising a series of overlapping alternately arranged stationary and movable grate members, the material advanced along the members passing through the outlet and being deposited upon the support near the upper end thereof, means for reciprocating the movable grate members to cause the material to be advanced downwardly along the grate and to subject the material to constant agitation during its advance, means for introducing hot gases into the heating compartment, means connecting the upper end of the drying compartment to a source of reduced pressure to cause the hot gases to flow over the surface of the material in the heating compartment and through the drying compartment along the supported layers of material therein successively, means connecting the heating compartment to a source of reduced pressure to cause a portion of the heated gases to pass through the bed of material on the support, and means controlling the proportion of heated gases caused to pass through the material in the heating compartment, said support being downwardly inclined at an angle less than the angle of repose of the material so that the material will be maintained in a bed on said support and reciprocatory movement of the movable members will cause pressure to be applied to the under portion of the bed to advance the same along the support at a substantially uniform rate under conditions of continuous agitation.

5. In an apparatus for the drying and heating of wet material, the combination of a closed chamber having an inlet opening near one end and an outlet near the other, a support within the chamber between said openings dividing the chamber into upper and lower compartments, the support comprising overlapping alternately arranged stationary and movable grate members, means for depositing material upon the support at the upper end thereof, means for reciprocating the movable members as a body to effect advance of the material down the grate while constantly agitating the material, means for introducing hot gases to the upper compartment, means connecting the upper compartment to a source of reduced pressure to cause the gases to flow along the support in contact with the material and means connecting the lower compartment to a source of reduced pressure to cause a portion of the gases to flow from the upper compartment through the material, said support being downwardly inclined at an angle less than the angle of repose of the material so that the material will be maintained in a bed on said support and reciprocatory movement of the movable members will cause pressure to be applied to the under portion of the bed to advance the same along the support at a substantially uniform rate under conditions of continuous agitation.

6. The method of conditioning material containing moisture which comprises feeding material into a chamber, advancing the materials through passageways in the chamber, thereafter forming and continuously maintaining a bed of material of substantially uniform cross-section on a support inclined downwardly at an angle less than the angle of repose of the material, advancing said bed of material downwardly over said support in a direction substantially parallel to the support, under conditions of continuous agitation to cause relative movement of the particles thereof and to grade the particles as to size, with the larger particles at the top of the bed, directing heated gases above the bed of material, maintaining a depressed pressure in the passageways to cause the heated gases to flow over the bed and through the passageways, maintaining a reduced pressure below the bed to cause a portion of the gases to flow through the material in the bed.

7. The method of conditioning material containing moisture which comprises feeding materials into a chamber, advancing the material through passageways in the chamber, forming the material into an approximately flat bed of substantially uniform thickness, continuously forming a bed of partially dried material particles on a support inclining downwardly at an angle less than the angle of repose of the material, applying mechanical pressure to the under portion of the bed to advance the same at a uniform rate under conditions of continuous agitation to grade the material particles, with the larger particles at the top and the smaller particles at the bottom, passing heated gases over the bed and through the passageways in surface contact with the material therein, and passing heated gas horizontally into the bed and generally in a direction opposite to that of its movement, the gases flowing through the bed with the hottest gases contacting the largest particles.

8. The method of conditioning material containing moisture which comprises feeding the material into a chamber, advancing the material over heat conducting surfaces forming passageways in the chamber heating the material from its upper and lower surfaces, continuously forming a bed of partially dried material particles on a support inclining downwardly at an angle less than the angle of repose of the material, applying mechanical pressure to the under portion of the bed to advance the same at a uniform rate under conditions of continuous agitation to grade the material particles, with the larger particles at the top and the smaller particles at the bottom, directing heated gases above the bed of material, maintaining a reduced pressure in the passageways to cause the heated gases to flow over the bed and through the passageways, maintaining a reduced pressure below the bed of material to cause streams of the heated gases to flow through the bed at successive horizontal levels, and continuously changing the horizontal location of the streams at alternate levels.

9. A method of conditioning wet materials which comprises feeding the material at a substantially uniform rate into a passageway at one end thereof, continuously advancing the material in a substantially horizontal direction through the passageway while continuously agitating the material, subjecting the material to heat from its top and bottom surfaces while in the passageways, discharging the material from the other end of the passageway into a compartment, forming and continuously maintaining a bed of material of substantially uniform cross-section on a support inclined downwardly at an angle less than the angle of repose of the material, advancing said bed of material downwardly over said support in a direction substantially parallel to the support, under conditions of continuous agitation to cause relative movement of the particles thereof and to grade the particles as to size, with the larger particles at the top of the bed, directing heated gases to the compartment, maintaining a reduced pressure in the passageways to cause the heated gases to flow over the material in the bed and through the passageways in a direction opposite to the direction of movement of the material, the material advancing through the passageways at a rate such as to permit the hot gases to dry the material to a substantially non-fluent condition before it is delivered to the bed maintaining a reduced pressure below the bed of material in the compartment to cause a portion of the heated gases to flow through the material in the bed.

10. In an apparatus for the drying and heating of wet material, the combination of a closed chamber having an inlet opening near one end and an outlet near the other, a support within the chamber between said openings dividing the chamber into upper and lower compartments, the support comprising overlapping alternately arranged stationary and movable grate members, means for depositing material upon the support at the upper end thereof, means for reciprocating the movable members as a body, means for introducing hot gases to the upper compartment, means connecting the upper compartment to a source of reduced pressure to cause the gases to flow along the grate in contact with the material, means connecting the lower compartment to a source of reduced pressure to cause a portion of the gases to flow from the upper compartment through the material, said support being downwardly inclined at an angle less than the angle of repose of the material so the material will be maintained in a bed on said support and reciprocatory movement of the movable members will cause pressure to be applied to the under portion of the bed to advance the same along the support at a substantially uniform rate under conditions of continuous agitation.

ALFRED E. DOUGLASS.